(12) United States Patent
Choi et al.

(10) Patent No.: US 10,749,205 B2
(45) Date of Patent: Aug. 18, 2020

(54) METHOD FOR PRODUCING POSITIVE ACTIVE MATERIAL PRECURSOR AND POSITIVE ACTIVE MATERIAL FOR LITHIUM SECONDARY BATTERIES, EXHIBITING CONCENTRATION GRADIENT, AND POSITIVE ACTIVE MATERIAL PRECURSOR AND POSITIVE ACTIVE MATERIAL FOR LITHIUM SECONDARY BATTERIES, EXHIBITING CONCENTRATION GRADIENT, PRODUCED BY SAME

(71) Applicant: ECOPRO BM CO., LTD., Cheongju-si, Chungcheongbuk-do (KR)

(72) Inventors: Moon Ho Choi, Cheongju-si (KR); Jik Soo Kim, Cheongju-si (KR); Jin Kyeong Yun, Cheongju-si (KR); Suk Yong Jeon, Chungju-si (KR); Jae Yong Jung, Cheongju-si (KR); Yong Chul Sung, Chungju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 298 days.

(21) Appl. No.: 15/630,014

(22) Filed: Jun. 22, 2017

(65) Prior Publication Data
US 2017/0288262 A1 Oct. 5, 2017

Related U.S. Application Data

(63) Continuation-in-part of application No. PCT/KR2015/007718, filed on Jul. 24, 2015.

(30) Foreign Application Priority Data

Dec. 31, 2014 (KR) .................. 10-2014-0195306

(51) Int. Cl.
| | | |
|---|---|---|
| *H01M 10/0525* | (2010.01) | |
| *H01M 4/505* | (2010.01) | |
| *H01M 4/525* | (2010.01) | |
| *C01G 53/00* | (2006.01) | |
| *H01M 4/36* | (2006.01) | |
| *H01M 4/02* | (2006.01) | |

(52) U.S. Cl.
CPC ...... *H01M 10/0525* (2013.01); *C01G 53/006* (2013.01); *C01G 53/44* (2013.01); *H01M 4/366* (2013.01); *H01M 4/505* (2013.01); *H01M 4/525* (2013.01); *C01P 2002/50* (2013.01); *C01P 2002/85* (2013.01); *C01P 2004/03* (2013.01); *C01P 2006/40* (2013.01); *H01M 2004/028* (2013.01); *Y02T 10/7011* (2013.01)

(58) Field of Classification Search
CPC ................................................ H01M 10/0525
See application file for complete search history.

(56) References Cited

U.S. PATENT DOCUMENTS

2013/0202966 A1* 8/2013 Yu .................. H01M 4/131
429/223

FOREIGN PATENT DOCUMENTS

| KR | 100752703 B1 | 8/2007 |
|---|---|---|
| KR | 20110083383 A | 7/2011 |
| KR | 20120079801 A | 7/2012 |
| KR | 20130080565 A | 7/2013 |
| KR | 20130111413 | 10/2013 |
| KR | 20130111413 A | 10/2013 |
| WO | WO 2011/087309 * | 7/2011 |

OTHER PUBLICATIONS

International Search Report dated Oct. 27, 2015 for PCT/KR2015/007718 and English translation.
Yang-Kook Sun et al., A Novel Cathode Material with a Concentration-Gradient for High-Energy and Safe Lithium-Ion Batteries, Adv. Fund. Mater. 2010, vol. 20, p. 485-491.

* cited by examiner

*Primary Examiner* — Austin Murata
(74) *Attorney, Agent, or Firm* — Lucas & Mercanti, LLP (57) ABSTRACT

Disclosed are a method for manufacturing a lithium secondary battery positive active material exhibiting a concentration gradient and a lithium secondary battery positive active material exhibiting a concentration gradient, manufactured by the method, and more particularly, a method for manufacturing a lithium secondary battery positive active material exhibiting a concentration gradient and a lithium secondary battery positive active material exhibiting a concentration gradient, manufactured by the method, the method being characterized by forming a barrier layer so as to maintain a concentration gradient layer even in case of thermal diffusion by a subsequent thermal treatment process.

6 Claims, 4 Drawing Sheets
(3 of 4 Drawing Sheet(s) Filed in Color)

METHOD FOR PRODUCING POSITIVE ACTIVE MATERIAL PRECURSOR AND POSITIVE ACTIVE MATERIAL FOR LITHIUM SECONDARY BATTERIES, EXHIBITING CONCENTRATION GRADIENT, AND POSITIVE ACTIVE MATERIAL PRECURSOR AND POSITIVE ACTIVE MATERIAL FOR LITHIUM SECONDARY BATTERIES, EXHIBITING CONCENTRATION GRADIENT, PRODUCED BY SAME

CROSS-REFERENCE TO RELATED APPLICATIONS

This application is a continuation-in-part of PCT/KR2015/007718, filed Jul. 24, 2015, which claims the benefit of Korean Patent Application No. 10-2014-0195306, filed Dec. 31, 2014, the contents of each of which are incorporated herein by reference.

FIELD OF THE INVENTION

Embodiments of the inventive concept relate to a method for manufacturing a positive active material and a lithium secondary battery positive active material precursor exhibiting a concentration gradient, and the positive active material and a lithium secondary battery positive active material precursor exhibiting a concentration gradient, manufactured by the method, and more particularly, relate to a method for manufacturing a positive active material and a lithium secondary battery positive active material precursor exhibiting a concentration gradient and including a barrier layer to maintain the concentration gradient layer even though thermal diffusion occurs due to subsequent thermal treatment, and the positive active material and a lithium secondary battery positive active material precursor exhibiting the concentration gradient, manufactured by the method.

BACKGROUND OF THE INVENTION

Among secondary batteries currently used in application, lithium ion batteries developed in the early 1990s are small, light, and large-capacity batteries and have been widely employed as power sources for portable devices since the advent of 1991.

Lithium secondary batteries are being spotlighted in the merits of having their superior energy density and higher operating voltage than conventional batteries such as Ni-MH, Ni—Cd, and sulfuric acid-lead batteries using aqueous electrolytes. Especially, in recent years, many studies about power sources for electric vehicles in hybrid types with internal combustion engines and lithium ion batteries are actively underway in the United States, Japan, and Europe.

While lithium ion batteries are considered as large-scale batteries in use for electric vehicles from the view of energy density, nickel-hydrogen batteries are used until now in the reason of stability. With respect to lithium ion batteries to be used for electric vehicles, the most urgent problem is a high price and stability. Specifically, there is generation of abrupt structural deformation if a positive active material, such as $LiCoO_2$ or $LiNiO_2$, which is currently used in commercialization, is heat up at 200 to 270° C. in an overcharge state of the battery. Such structural deformation results in a shortness that causes a discharge of oxygen from a lattice and thereby a crystalline structure becomes unstable due to secession of lithium and much severe degradation of thermal characteristics.

For eliminating the shortness, they are trying to prevent an abrupt exothermic reaction or to shift heat starting temperature toward high temperature by partly replacing nickel with a transition element. A material such as $LiNi_{1-x}Co_xO_2$ (x=0.1~0.3), where nickel is partly replaced with cobalt, shows excellent charge/discharge and lifetime characteristics, but insufficient to solve the problem of thermal stability. Additionally, there are much known technologies for organizing and manufacturing an oxide composite of Li—Ni—Mn series where a Ni position is replaced partly with Mn that is excellent in thermal stability, or of Li—Ni—Mn—Co series where an Ni position is replaced with Mn or Co. Japanese Patent No 2000-227858 has recently disclosed a new concept of positive active material for making a solid solution by uniformly dispersing a compound of Mn and Ni in atomic levels without the partial replacement of a transition metal in $LiNiO_2$ or $LiMnO_2$. For example, according to European Patent No. 0918041 or U.S. Pat. No. 6,040,090 about composition of an Li—Ni—Mn—Co series oxide composite where Ni is replaced with Mn and Co, $LiNi_{1-x}Co_xMn_yO_2$ (0<y≤0.3) has thermal stability more improved than a material which is formed of Ni and Co only, but is insufficient to solve the problem of thermal stability involved in Ni series materials.

In the meantime, methods for varying surface composition of positive active materials in contact with electrolytes are applied to solve such a problem. One of the methods is to coat the surface. Generally, an amount of coating is known as equal to or smaller than 1 to 2 weight % compared to a positive active material and a coated layer is known as restraining a side reaction with an electrolyte by forming a very thin film layer about several nanometers. In some case, high temperature of thermal treatment after coating forms a solid solution on the surface of powder particles to make the inside of the particles different from the surface in metallic composition. In this case, a surface layer coupled with a coating material is known as having a thickness equal to or smaller than several tens nanometers and its coating effect becomes lower when it is used for a long term of several hundreds cycles because of a sharp composition difference between the coated later and the bulk of particles.

Additionally, the coating layer loses half its effect due to incomplete coating of ununiform distribution over the surface.

For eliminating such shortness, Korean Patent Application No. 10-2005-7007548 has proposed a solution about a lithium transition-metal oxide having a concentration gradient of metallic composition. However, this method is able to make inner and outer layers different each other in metallic composition, but the metallic composition does not vary continuously and gradually in a generated positive active material. Although it is possible for the method to form a gradual concentration gradient of metallic composition through thermal treatment, there is merely generated a difference of concentration gradients due to thermal diffusion of metal ions at high temperature of thermal treatment equal to or higher than 850° C. Additionally, a powder synthesized by the foregoing invention is unsuitable for a lithium secondary battery positive active material due to low tap density of the powder because it does not use ammonia which is a chelating agent. Additionally, this method fails in reproducibility due to difficulty of lithium amount control in an outer layer in the case of using a lithium transition metal oxide as an inner material.

Korean Patent Application No. 10-2004-0118280 proposes a double layer structure having a core-shell structure. This foregoing invention reports a material having high thermal stability and high capacity characteristics by organizing a positive composite of high capacity characteristics in a core, through a CSTR reactor, and by organizing a positive composite of high thermal stability in an outer shell.

However, even with the forgoing invention, it is difficult to form a continuous concentration distribution between two interfaces due to diffusion of metal ions at an interface where the inner core meets the outer shell.

SUMMARY OF THE INVENTION

For solving the aforementioned problems arising from conventional arts, embodiments of the inventive concept provide a method for manufacturing a lithium secondary battery positive active material precursor having a concentration gradient layer exhibiting a desired continuous concentration gradient even at an interface where a core meets an outer shell, a method for an positive active material, a positive active material precursor manufactured by the method, and a positive active material manufactured by the method.

According to an aspect of the inventive concept, a method for manufacturing a lithium secondary battery positive active material having a concentration gradient layer includes inputting a chelating agent solution into a reactor, continuously inputting a core forming solution, a chelating agent solution, and an alkaline solution into the reactor at the same time and obtaining a spherical precipitate forming a core layer, continuously inputting a barrier layer forming solution, a chelating agent solution, and an alkaline solution into the reactor at the same time and obtaining a spherical precipitate forming a barrier layer, preparing a shell forming solution and continuously mixedly inputting a chelating agent solution, an alkaline solution, the core forming solution, and the shell forming solution into the reactor at the same time and obtaining a precipitate, which forms the concentration gradient layer where concentration of nickel-manganese-cobalt varies gradually and relatively, on a surface of the barrier layer, drying the precipitate, and thermally treating the dried precipitate.

In the method for manufacturing the lithium secondary battery positive active material having the concentration gradient layer according to an embodiment, the barrier layer forming solution may include Ni and Mn.

In the method for manufacturing the lithium secondary battery positive active material having the concentration gradient layer according to an embodiment, the barrier layer forming solution may include Ni and Mn in a mole ratio of 30:70 to 70:30.

In the method for manufacturing the lithium secondary battery positive active material having the concentration gradient layer according to an embodiment, the barrier layer forming solution may include Ni and Mn in a mole ratio of 50:50.

In the method for manufacturing the lithium secondary battery positive active material having the concentration gradient layer according to an embodiment, the core forming solution may include a mole ratio of Ni:Co:Mn=a:b:1−(a+b)(0.7≤a≤1.0, 0≤b≤0.2).

In the method for manufacturing the lithium secondary battery positive active material having the concentration gradient layer according to an embodiment, the shell forming solution may include a mole ratio of Ni:Co:Mn=a:b:1−(a+b)(0.3≤a≤0.6, 0≤b≤0.4).

In the method for manufacturing the lithium secondary battery positive active material having the concentration gradient layer according to an embodiment, the preparing of the shell forming solution and the continuously mixedly putting of the chelating agent solution, the alkaline solution, the core forming solution, and the shell forming solution into the reactor at the same time may include mixing the core forming solution and the shell forming solution in an additional preliminary reactor and continuously putting the mixed solution into the reactor at the same time.

The method for manufacturing the lithium secondary battery positive active material having the concentration gradient layer according to an embodiment may further include continuously mixedly putting a shell forming solution, a chelating agent solution, and an alkaline solution into the reactor at the same time and obtaining a spherical precipitate forming a shell layer between the preparing of the shell forming solution and the continuously mixedly putting of the chelating agent solution, the alkaline solution, the core forming solution, and the shell forming solution into the reactor at the same time, and the drying of the precipitate.

According to another aspect of the inventive concept, a lithium secondary battery positive active material precursor having a concentration gradient layer is manufactured by the method for manufacturing the lithium secondary battery positive active material having the concentration gradient layer according to an embodiment.

In the lithium secondary battery positive active material precursor having the concentration gradient layer, a barrier layer may have a thickness equal to or larger than 0.01 μm and smaller than 2.0 μm, or equal to or larger than 1% and smaller than 20% of a volume of particles.

In the lithium secondary battery positive active material precursor having the concentration gradient layer, a size of a primary particle may be reduced in 10 to 40% from a size of a primary particle of a positive active material precursor having the same composition without a barrier layer.

According to another aspect of the inventive concept, a method for manufacturing a lithium secondary battery positive active material having a concentration gradient layer includes mixing a lithium secondary battery positive active material precursor having a concentration gradient layer with a lithium compound, and thermally treating the mixture for 10 to 25 hours in oxidation atmosphere of air or oxygen at 750 to 1000° C.

According to another aspect of the inventive concept, a lithium secondary battery positive active material having a concentration gradient layer is manufactured by the method for manufacturing the lithium secondary battery positive active material having the concentration gradient layer according to an embodiment.

Other aspects, advantages, and salient features of the disclosure will become apparent to those skilled in the art from the following detailed description, which, taken in conjunction with the annexed drawings, discloses various embodiments of the present disclosure.

Embodiments of the inventive concept provide a method for manufacturing a positive active material and a lithium secondary battery positive active material precursor exhibiting a concentration gradient and including a barrier layer between a core with uniform concentration and a shell part with the concentration gradient. A positive active material has an effect of showing a continuous concentration distribution, which is desired from design, even at an interface where a core meets an outer shell though a transition metal is diffused between the core and the outer shell.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Hereinafter, embodiments of the inventive concept will be described in conjunction with the accompanying drawings, but the inventive concept may not be restrictive to the following embodiments.

Embodiment-1

After putting distilled water of 20 L and ammonia of 1 kg into a batch reactor (90 L in capacity), a solution of 53 g, which was mixed with nickel sulfate, cobalt sulfate, and manganese sulfate in a mole ratio of 90:10:0, was input thereinto as a core forming solution in concentration of 2.5 M.

Next, a core forming solution, which was mixed with nickel sulfate, cobalt sulfate, and manganese sulfate in a mole ratio of 90:10:0 and has concentration of 2.5 M, was input into the reactor in a rate of 2.41 L/hour, and continuously an ammonia solution having concentration of 28% was input into the reactor in a rate of 0.29 L/hour. Additionally, for adjusting pH, a sodium hydroxide solution having concentration of 25% was supplied to maintain pH on 11.2. An impeller speed was adjusted to 350 rpm. The prepared core forming solution, ammonia solution, and sodium hydroxide solution were continuously input into the reactor in an amount of 60.5 L. Considering a capacity of the reactor, the reaction proceeded while discharging a supernatant in a specific time.

Next, after preparing a barrier layer forming solution which had concentration of 2.5 M and was mixed with nickel sulfate, cobalt sulfate, and manganese sulfate in a mole ratio of 50:0:50, the barrier layer forming solution was input into the reactor in a rate of 2.41 L/hour and continuously an ammonia solution having concentration of 28% was input into the reactor in a rate of 0.29 L/hour. In this case, an input amount of the barrier layer forming solution, ammonia solution, and sodium hydroxide solution was 3.7 L.

Next, for adapting a mole ratio of nickel sulfate, cobalt sulfate, and manganese sulfate to 65:15:20, a concentration gradient layer forming solution, which had concentration of 2.5 M where nickel sulfate, cobalt sulfate, and manganese sulfate were mixed in a mole ratio of 19.4:24.3:56.3, was mixed with a core forming solution, which had concentration of 2.5 M where nickel sulfate and cobalt sulfate were mixed in a mole ratio of 90:10, in an additional agitator in addition to the batch reactor. An ammonia solution having concentration of 28% was input in a rate of 0.29 L/hour and a sodium hydroxide solution was maintained in pH of 11.2. In this case, an input amount of the concentration gradient layer forming solution, ammonia solution, and sodium hydroxide solution was 9.91 L.

Next, as a fifth operation, a shell forming solution, which was mixed with nickel sulfate, cobalt sulfate, and manganese sulfate in a mole ratio of 40:20:40, was input into a batch reactor in a rate of 2.41 L/hour, an ammonia solution was input in a rate of 0.29 L/hour, and a sodium hydroxide solution was input to maintain pH of 11.2. After completing the reaction, a spherical nickel-manganese-cobalt composite hydroxide precipitate was obtained from the batch reactor.

The precipitated composite metal hydroxide was filtered and washed by water, and then dried through a hot-air blower at 110° C. to obtain a powder.

Next, as a seventh operation, after mixing the composite metal hydroxide, which was obtained through the sixth operation, with lithium hydroxide, the mixture was thermally treated for 10 to 20 hours at 810° C. to obtain a lithium secondary battery positive active material.

Embodiment-2

A lithium secondary battery positive active material was obtained in the same manner with Embodiment-1, but first forming a concentration gradient layer and then a barrier layer after forming a core layer.

Embodiment-3

A lithium secondary battery positive active material was obtained in the same manner with Embodiment-1, but forming a core layer, a concentration gradient layer, and a shell layer, and then forming a barrier layer on the outmost shell of shell layers.

Embodiment-4

A lithium secondary battery positive active material was obtained in the same manner with Embodiment-1, but forming a barrier layer and a shell layer without forming a concentration gradient layer after forming a core layer.

Embodiment-5

A lithium secondary battery positive active material was obtained in the same manner with Embodiment-1, but making an average particle composition in Ni:Co:Mn=64:19:17.

Embodiment-6

A lithium secondary battery positive active material was obtained in the same manner with Embodiment-1, but designing an average particle composition in Ni:Co:Mn=66:17:17 and performing thermal treatment at 920° C.

<Comparison-1>

After putting distilled water of 20 L and ammonia of 1 kg into a batch reactor (90 L in capacity), a solution, which had concentration of 2.5 M and was mixed with nickel sulfate, cobalt sulfate, and manganese sulfate in a mole ratio of 90:10:0, was input with 53 g.

The solution was agitated in 350 rpm while maintaining the reactor at temperature of 46° C.

Next, as a second operation, a first precursor solution, which had concentration of 2.5 M and was mixed with nickel sulfate, cobalt sulfate, and manganese sulfate in a mole ratio of 90:10:0, was input into the reactor in a rate of 2.41 L/hour and continuously an ammonia solution having concentration of 28% was input into the reactor in a rate of 0.29 L/hour. Additionally, for adjusting pH, a sodium hydroxide solution having concentration of 25% was supplied to maintain the pH on 11.2. An impeller speed was adjusted to 350 rpm. The prepared first precursor solution, ammonia solution, and sodium hydroxide solution were continuously input into the reactor in an amount of 63.87 L.

Next, as a third operation, for adapting a mole ratio of nickel sulfate, cobalt sulfate, and manganese sulfate to 65:15:20, after preparing a concentration gradient layer forming solution, which had concentration of 2.5 M and was mixed with nickel sulfate, cobalt sulfate, and manganese sulfate in a mole ratio of 19.4:24.3:56.3, and measuring 8.016 kg of a solution which had concentration of 2.5 M and was mixed with nickel sulfate, cobalt sulfate, and manganese sulfate in a mole ratio of 90:10:0 in an additional agitator in addition to the batch reactor during the second operation, the solution of the second operation was input as a concentration gradient layer forming solution of the third operation. An ammonia solution having concentration of 28% was input in a rate of 0.29 L/hour and a sodium hydroxide solution was maintained on pH of 11.2. In this case, an input amount of a precursor solution, ammonia solution, and sodium hydroxide solution was 10.06 L.

As a fourth operation, a fourth precursor solution, which is mixed with nickel sulfate, cobalt sulfate, and manganese sulfate in a mole ratio of 40:20:40, was input into a batch reactor in a rate of 2.41 L/hour, an ammonia solution having concentration of 28% was input in a rate of 0.29 L/hour, and a sodium hydroxide solution was input to maintain pH of 11.2. In this case, an input amount of a precursor solution, ammonia solution, and sodium hydroxide solution was 11.07 L.

Comparison 2 and Comparison 3 manufactured active materials in the same manner with Comparison 1, but setting temperature of thermal treatment at 810° C. and 790° C., respectively.

<Comparison-4>

After putting distilled water of 20 L and ammonia of 1 kg into a batch reactor (90 L in capacity), a solution, which had concentration of 2.5 M and was mixed with nickel sulfate, cobalt sulfate, and manganese sulfate in a mole ratio of 80:10:10, was input in 80.6 g.

The solution was agitated in 400 rpm while maintaining the reactor at temperature of 46° C.

Next, as a second operation, a first precursor solution, which had concentration of 2.5 M and was mixed with nickel sulfate, cobalt sulfate, and manganese sulfate in a mole ratio of 80:10:10, was input into the reactor in a rate of 2.41 L/hour and continuously an ammonia solution having concentration of 28% was input into the reactor in a rate of 0.29 L/hour. Additionally, for adjusting pH, a sodium hydroxide solution having concentration of 25% was supplied to maintain the pH in 11.4~11.5. An impeller speed was adjusted to 300~400 rpm. The prepared first precursor solution, ammonia solution, and sodium hydroxide solution were continuously input into the reactor in an amount of 77.22 L.

<Comparison-5>

After putting distilled water of 20 L and ammonia of 1 kg into a batch reactor (90 L in capacity), a solution, which had concentration of 2.5 M and was mixed with nickel sulfate, cobalt sulfate, and manganese sulfate in a mole ratio of 60:20:20, was input in 80.6 g.

The solution was agitated in 400 rpm while maintaining the reactor at temperature of 46° C.

Next, as a second operation, a first precursor solution, which had concentration of 2.5 M and was mixed with nickel sulfate, cobalt sulfate, and manganese sulfate in a mole ratio of 60:20:20, was input into the reactor in a rate of 2.41 L/hour and continuously an ammonia solution having concentration of 28% was input into the reactor in a rate of 0.29 L/hour. Additionally, for adjusting pH, a sodium hydroxide solution having concentration of 25% was supplied to maintain the pH in 11.4~11.5. An impeller speed was adjusted to 400~450 rpm. The prepared first precursor solution, ammonia solution, and sodium hydroxide solution were continuously input into the reactor in an amount of 77.22 L. Considering the capacity of the reactor, the reaction proceeded while discharging a supernatant in a specific time.

Compositions of the particles manufactured through the aforementioned embodiments and comparisons are summarized Table 1 as follows.

TABLE 1

| | <Experimental example> Monitoring by SEM | | | | | | | | |
|---|---|---|---|---|---|---|---|---|---|
| | Bulk composition, mol % | | | | Barrier layer applied | | | | Calcination temperature (° C.) |
| No | Ni | Co | Mn | Al | Position | Ni/Mn | Thickness, μm | Volume, % | |
| Comparison-1 | 80 | 12 | 8 | — | — | — | — | — | 790 |
| Comparison-2 | 80 | 12 | 8 | — | — | — | — | — | 810 |
| Comparison-3 | 80 | 12 | 8 | — | — | — | — | — | 790 |
| Comparison-4 | 80 | 10 | 10 | — | — | — | — | — | 750 |
| Comparison-5 | 60 | 20 | 20 | — | — | — | — | — | 850 |
| Embodiment-1 | 79 | 11 | 10 | — | Core-grad | 50/50 | 0.10 | 4.0 | 810 |
| Embodiment-2 | 79 | 11 | 10 | — | Grad-shell | 50/50 | 0.10 | 5.0 | 810 |

TABLE 1-continued

<Experimental example> Monitoring by SEM

| No | Bulk composition, mol % | | | | Barrier layer applied | | | | Calcination temperature (° C.) |
|---|---|---|---|---|---|---|---|---|---|
| | Ni | Co | Mn | Al | Position | Ni/Mn | Thickness, μm | Volume, % | |
| Embodiment-3 | 79 | 11 | 10 | — | Shell end | 50/50 | 0.10 | 5.0 | 810 |
| Embodiment-4 | 80 | 10 | 10 | — | Core-shell | 50/50 | 0.20 | 10.0 | 810 |
| Embodiment-5 | 64 | 19 | 17 | — | Core-grad | 50/50 | 0.25 | 8.0 | 900 |
| Embodiment-6 | 66 | 17 | 17 | — | Core-grad | 50/50 | 0.25 | 10.0 | 920 |
| Embodiment-7 | 78 | 11 | 11 | — | Core-grad | 30/70 | 0.10 | 4.0 | 810 |
| Embodiment-8 | 79 | 11 | 10 | — | Grad-shell | 60/40 | 0.15 | 7.0 | 810 |

Figure 1:
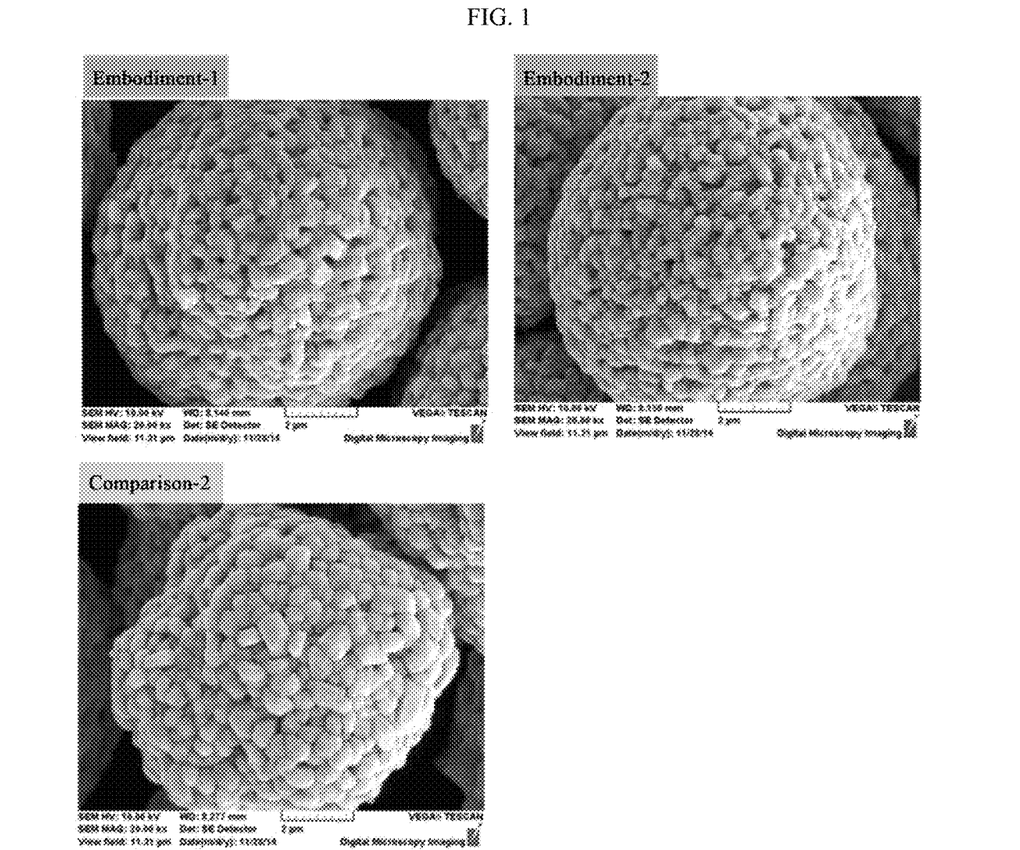
FIG. 1 shows results of taking SEM images of active particles manufactured through comparisons and embodiments according to the inventive concept.

FIG. 1 shows results of taking Scanning Electron Microscope (SEM) images from the active particles manufactured through Embodiment-1, Embodiment-2, and Comparison-2.

From FIG. 1, it may be seen that while Comparison-2 without a barrier layer in an positive active material shows about 0.6 to 0.7 μm as a result of measuring a longitudinal average width value of primary particles, Embodiment-1 employing a barrier layer on the surface of the layer and Embodiment-2 employing a barrier layer on the surface of a concentration gradient layer show about 0.4 to 0.5 μm as results of measuring longitudinal average width values of primary particles. Therefore, it may be known that the barrier layer contributes to restraining the growth of primary particles.

<Experimental Example> Monitoring by EDX

Figure 2:
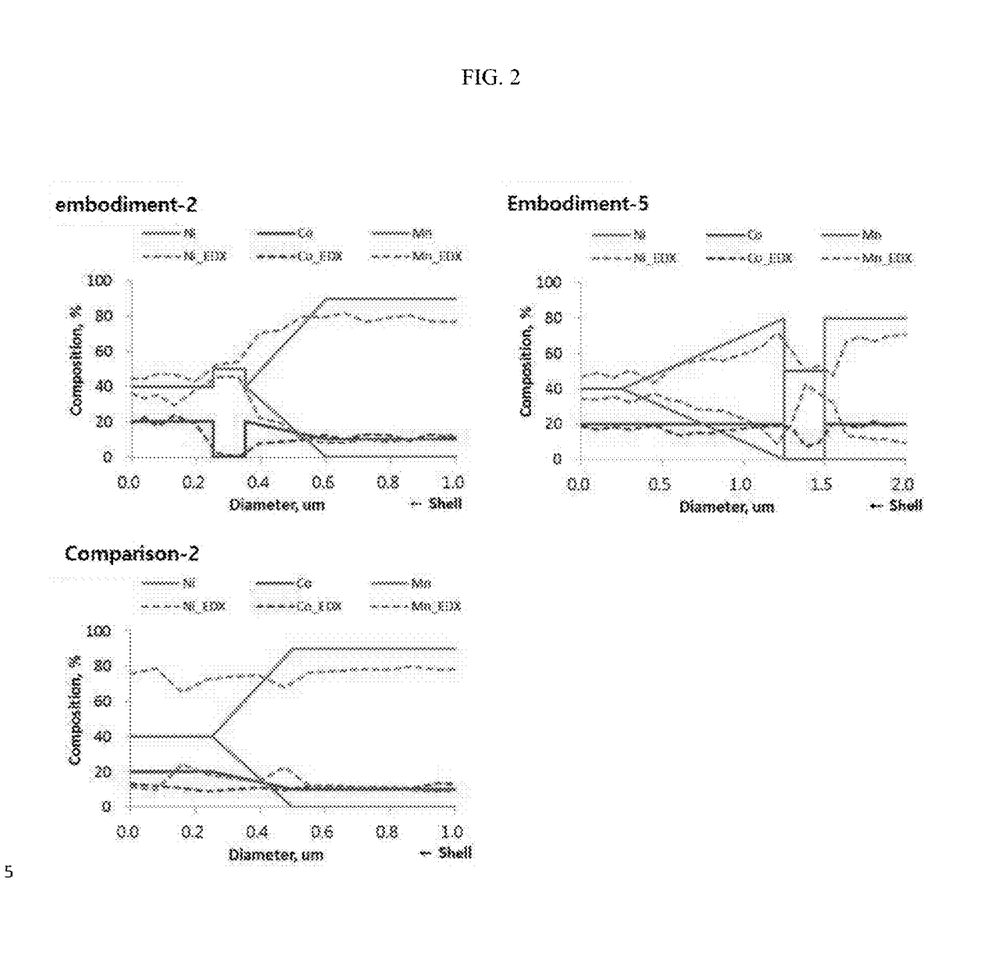
FIG. 2 shows results of measuring concentrations of transition metals in active particles manufactured through comparisons and embodiments according to the inventive concept.

FIG. 2 shows results of measuring, by Energy Dispersion X-ray spectroscopy (EDX), concentration of transition metals in particles of an active material manufactured through Embodiment-2, Embodiment-5, and Comparison-2 and comparing them with practically designed concentration.

For Comparison-2 having a positive active material without a barrier layer, there was an apparent difference between a practical concentration gradient (the dotted line) and a designed concentration gradient (the solid line) due to metallic diffusion after thermal treatment. Differently, it could be seen that for Embodiment-2 employing a barrier layer after forming a concentration gradient layer and Embodiment-5 employing a barrier layer after forming a core layer, metallic diffusion was restrained by a small difference between a designed concentration gradient (the solid line) and a practical concentration gradient (the dotted line).

<Experimental Example> Evaluating Charge/Discharge Characteristics

Figure 3:
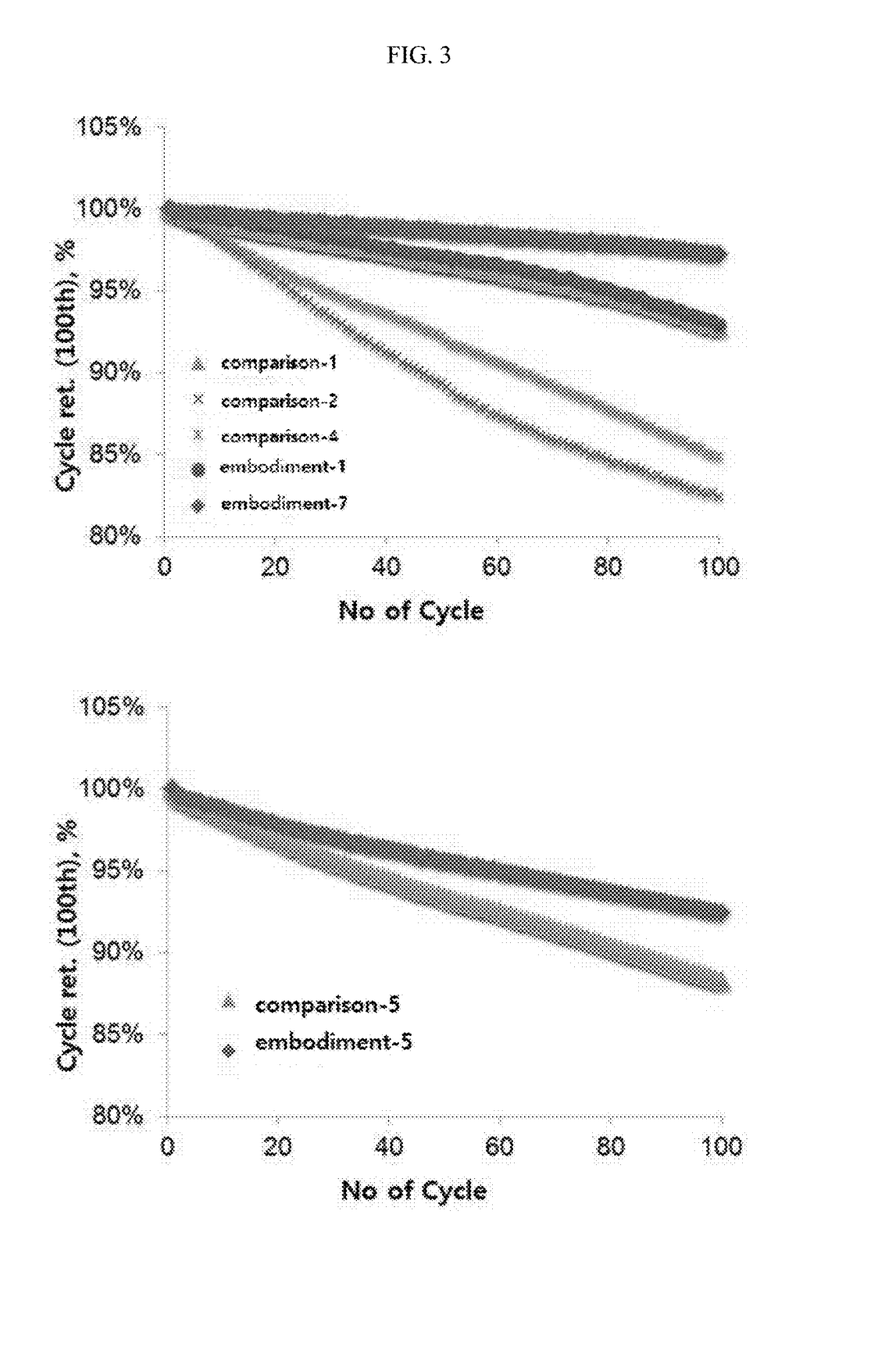
FIG. 3 shows results of measuring charge/discharge characteristics of batteries including active particles manufactured through comparisons and embodiments according to the inventive concept.

FIG. 3 shows results of using positive active materials. The positive active materials were manufactured through the aforementioned Embodiments and Comparisons, as positive electrodes, manufacturing respective coin cells by using a lithium metal as a negative electrode, and performing a charge/discharge experiment between 3~4.3 V in charge and discharge rates of C/10 (1C=150 mA/g).

Embodiment-1 employing a barrier layer on the surface of a core layer had higher firing temperature than that of Comparison-1 without a barrier layer but had the same lifetime. Differently, Comparison-2, which performed thermal treatment at the same temperature with Embodiment-1, without a barrier layer, was greatly degraded in lifetime. Embodiment-1 was better in lifetime than Comparison-4 having a composition of NCM811 without a concentration gradient.

<Experimental Example> Measuring Unreacted Lithium

Measuring unreacted lithium was performed with an amount of 0.1 M of HCl which was used until pH reaches 4. First, after putting a positive active material of 5 g into distilled water of 100 ml, agitating the solution for 15 minutes, filtering the solution, and taking the filtered solution of 50 ml, HCl of 0.1 M was added to the filtered solution and a consumption amount of HCl dependent on pH variation was measured to determine Q1 and Q2. The unreacted LiOH and $Li_2CO_3$ were calculated based on the following equations.

$M1=23.94$ (LiOH molecular weight)

$M2=73.89$ ($Li_2CO_3$ molecular weight)

Figure 4:
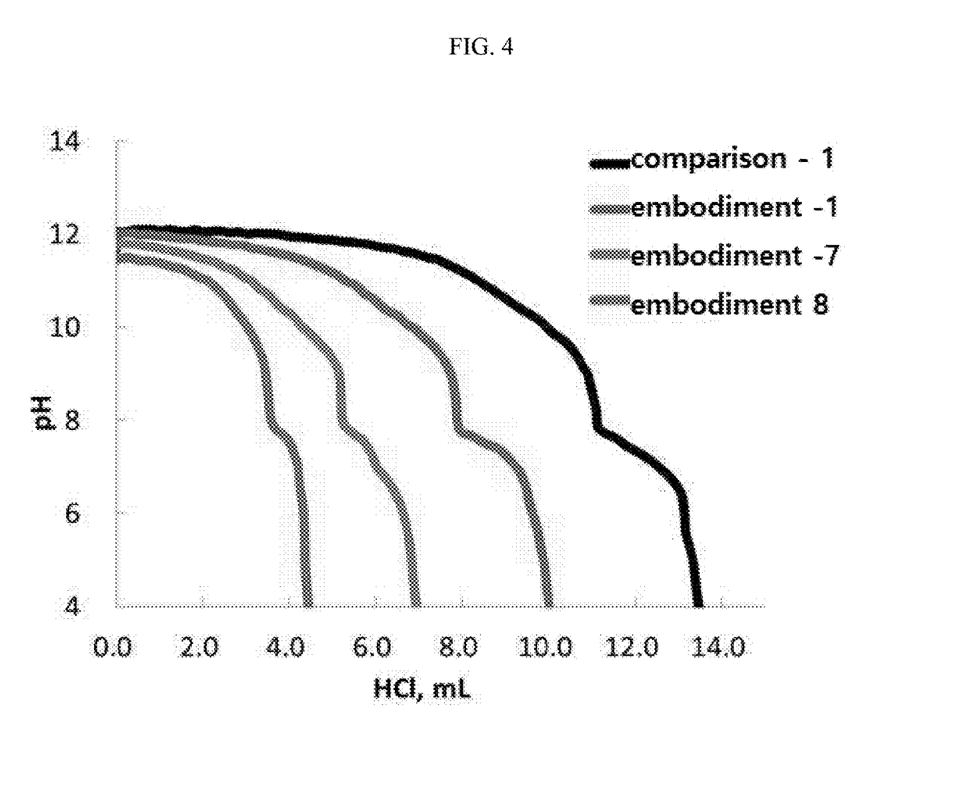
FIG. 4 shows results of measuring residual lithium amounts of batteries including active particles manufactured through comparisons and embodiments according to the inventive concept.

$SPL\ size = (Sample\ weight \times Solution\ weight)/Water\ weight$ $LiOH(wt\ \%) = [(Q1-Q2) \times C \times M1 \times 100]/(SPL\ size \times 1000)$ $Li_2CO_3(wt\ \%) = [2 \times Q2 \times C \times M2/2 \times 100]/(SPL\ size \times 1000)$ FIG. 4 shows results of measuring concentration of the unreacted LiOH and $Li_2CO_3$ from an NCA series lithium oxide composite manufactured through the aforementioned Embodiments and Comparisons by the method described above.

Embodiment-1 employing a barrier layer on the surface of a core layer has smaller residual lithium because optimum temperature of thermal treatment is higher than that of Comparison-1 without a barrier layer.

As described above, a positive active material and a lithium secondary battery positive active material precursor exhibiting a concentration gradient according to embodiments of the inventive concept may be useful for industrial applicability in the points that a barrier layer is included between a shell part showing a concentration gradient and a core having uniform concentration, and the manufactured positive active material has a continuous concentration distribution, which is desired from design, appearing even at an interface where the core meets an outer shell even though a transition metal is diffused between a shell and the core.

The invention claimed is:

1. A method for manufacturing a lithium secondary battery positive active material having a concentration gradient layer, the method comprising:

inputting a first chelating agent solution into a reactor;

continuously inputting a core forming solution with constant concentration, a second chelating agent solution, and a first alkaline solution into the reactor at the same time and obtaining a spherical precipitate forming a core layer;

continuously inputting a barrier layer forming solution with constant concentration, a third chelating agent solution, and a second alkaline solution into the reactor at the same time and obtaining a spherical precipitate forming a barrier layer, wherein said barrier layer forming solution includes Ni and Mn in a mole ratio of 30:70 to 70:30, wherein the Co molar content of the barrier layer forming solution is 0;

preparing a shell forming solution and continuously mixedly inputting a fourth chelating agent solution, a third alkaline solution, the core forming solution, and the shell forming solution into the reactor at the same time and obtaining a precipitate, which forms the concentration gradient layer where concentration of nickel-manganese-cobalt varies gradually and relatively, on a surface of the barrier layer, wherein the core forming solution and the shell forming solution have different compositions of Ni, Co, and Mn;

continuously inputting a shell forming solution with constant concentration, a fifth chelating agent solution, and a fourth alkaline solution into the reactor at the same time and obtaining a spherical precipitate forming a shell layer, drying the precipitate; and thermally treating the dried precipitate, wherein the barrier layer has a thickness equal to or larger than 0.01 μm and smaller than 2.0 μm in the positive active material particles, and wherein said first chelating agent solution, said second chelating agent solution, said third chelating agent solution, said fourth chelating agent solution and said fifth chelating solution are the same, and wherein said first alkaline solution, said second alkaline solution, said third alkaline solution and said fourth alkaline solution are the same.

2. The method of claim 1, wherein the barrier layer forming solution includes Ni and Mn in a mole ratio of 50:50.

3. The method of claim 1, wherein the core forming solution includes a mole ratio of Ni:Co:Mn=a:b:1−(a+b) ($0.7 \leq a \leq 1.0$, $0 \leq b \leq 0.2$).

4. The method of claim 1, wherein the shell forming solution includes a mole ratio of Ni:Co:Mn=a:b:1−(a+b) ($0.3 \leq a \leq 0.6$, $0 \leq b \leq 0.4$).

5. The method of claim 1, further comprising:

mixing a lithium secondary battery positive active material having a concentration gradient layer according to claim 1 with a lithium compound; and thermally treating the mixture for 10 to 25 hours in oxidation atmosphere of air or oxygen at 750 to 1000° C.

6. A lithium secondary battery positive active material, having a concentration gradient layer, manufactured by the method according to claim 5.

* * * * *